United States Patent Office 2,750,239
Patented June 12, 1956

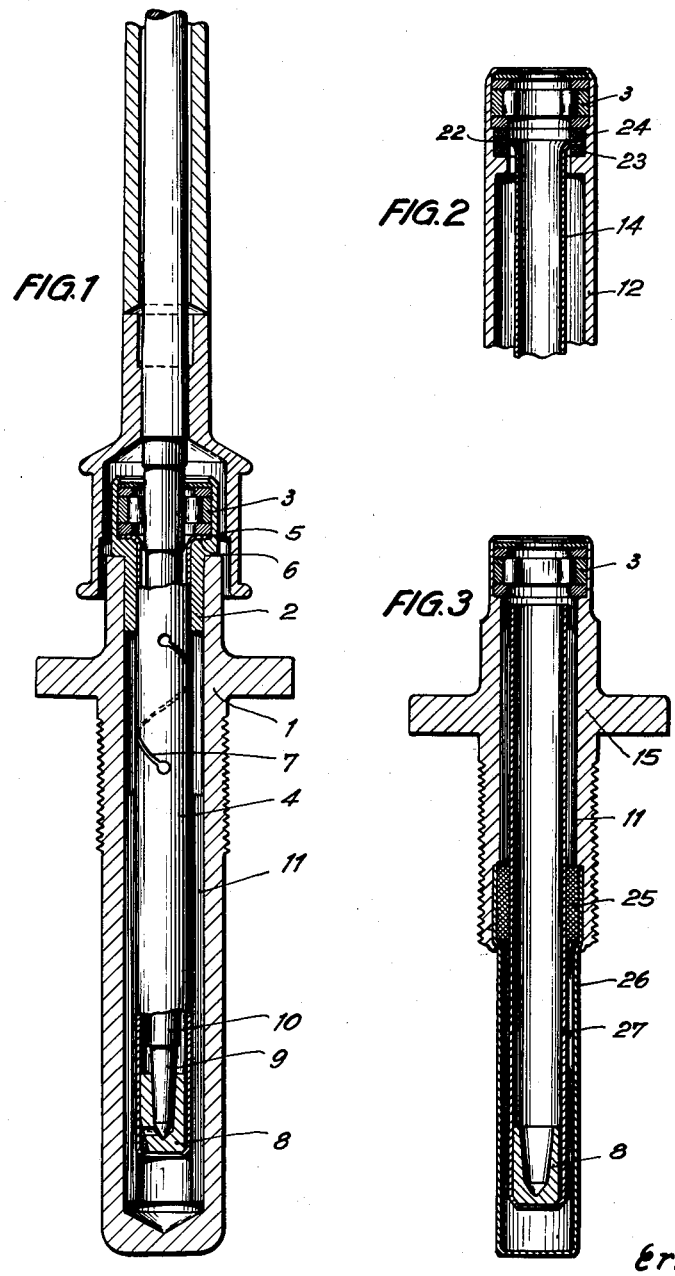

2,750,239

BEARING UNIT FOR SPINDLES OF SPINNING FRAMES AND TWISTING FRAMES

Ernst Rogner, Bad Cannstatt, and Joseph Steichele, Stuttgart-Weil im Dorf, Germany, assignors to SKF Kugellagerfabriken Gesellschaft mit beschränkter Haftung Application February 9, 1952, Serial No. 270,823

Claims priority, application Germany February 22, 1951

4 Claims. (Cl. 308—228)

This invention relates to a bearing unit for spindles of spinning frames and twisting frames, whereby the bearing unit comprises neck and footstep bearings for the spindle blade which is inserted in a sleeve which in turn is fitted in a spindle bolster. The sleeve may be a single-part or a multipartite structure.

It is well known that spindles carrying cumulative yarn bodies will vibrate and start whirring, due to lack of balance, particularly when passing the critical speed ranges. This tends to deteriorate the yarn quality, besides an unduly stressing of the bearing parts as the existent troubles increase.

The primary object of the present invention is to generally improve bearing units of the type referred to.

In an endeavour to overcome the difficulties resulting from troublesome operating conditions, i. e., to overcome out-of-balance conditions and to eliminate detrimental effects on the bearing parts as much as possible, various constructional changes have been proposed, which changes embrace the neck and footstep bearings in themselves, their direct or indirect mounting in the spindle bolster, as well as the use of rigid or flexible spindle inserts in connection with spring attachments and damping devices, respectively. However, it appeared that all these attempts resulted in impractical, if not extravagant constructions.

Moreover, the hitherto known constructions, more or less footing on empiric principles, have been found to evince no essential changes in the spindle bolster with regard to a rigid or flexible arrangement in the spindle bolster, and respecting the locking of the bearings by rigid or resilient structural elements. On the other hand, the neck and footstep bearings have been modified again and again by making optional use of ball bearings and roller bearings.

The neck bearing has mostly been arranged flexibly or at least movably, and, with the exception of a few rigid devices, the majority of all footstep constructions have also been mounted flexibly, and that partly in combination with some kind of damping means.

Important objects of our invention center about a bearing unit that will make it possible for the spindle to exceed the critical speed ranges without whirring and almost noiselessly. We have found that this aim can be attained if certain structural characteristics concur, in which case, however, contrary to the hitherto usual flexible arrangement of the neck bearing, the neck bearing is devised to be rigidly supported.

Other objects of our invention are to eliminate or to minimize all detrimental effects on the bearing parts of the bearing unit.

To the accomplishment of the foregoing and other more detailed objects which will hereinafter appear, my invention consists in the bearing unit, the elements thereof, and the relation of the elements one to the other, as hereinafter are more particularly described in the specification and sought to be defined in the claims. The specification is accompanied by a drawing in which:

Fig. 1 is a partially sectioned elevation of a bearing unit embodying features of our invention, and illustrating a one-piece spindle bolster with the spindle, a centering sleeve, the bearings, and a damping arrangement;

Fig. 2 is a section taken in elevation through a detail of a bearing unit, illustrating the support of the centering sleeve; and Fig. 3 is a section taken in elevation through a two-piece spindle bolster with component parts.

According to Fig. 1, an insert 2 with an anti-friction bearing 3, the latter forming the neck bearing, is mounted in a one-piece spindle bolster 1. A centering sleeve 4 is pressed into the insert 2, whereby a face of the ring flange 5 of the centering sleeve bears against a shoulder 6 of a recess in the insert. A helical incision 7 gives elastic flexibility to the centering sleeve 4, the latter receiving at its lower end a footstep bearing 8 for the foot end 9 of the spindle 10. The space between the centering sleeve 4 and the lower part of the spindle bolster 1 accommodates a damping means 11.

In Fig. 2, it is shown how the ring flange 22 of the centering sleeve 14 is supported between two elastic rings 23 and 24. These rings are fitted beneath the roller bearing 3 which is flanged directly into the bolster 12.

The spindle bolster according to Fig. 3 is of a two-piece design. The neck bearing 3 is mounted in the upper part 15 of the bolster. The centering sleeve 27 is supported in the lower part 26 of the spindle bolster by means of an elastic bushing 25. Accommodation of the damping means 11 is provided above this bushing in the annular space between the centering sleeve 27 and the upper part of the spindle bolster.

Slight misalignments that might occur when passing the critical speed ranges, can be counteracted by designing the outer ring raceway a trifling convex and/or by using rollers ground slightly conically in the proximity of their end faces.

From the foregoing detailed description of a few forms of the spindle-bearing unit of our invention, it will be understood that the unit is characterized by the following features. The anti-friction type of neck bearing is rigidly supported in the spindle bolster. A centering sleeve carrying the footstep bearing for the foot end of the spindle blade, in itself of a flexible design or mounted with elastic flexibility, respectively, is fitted in the spindle bolster, preferably near the neck bearing. A damping means is provided between the spindle bolster and the centering sleeve.

The elastic flexibility of the centering sleeve, as provided according to the invention, can be accomplished by changing the moment of resistance in various cross sections, in which case, for instance, the tube walls are weakened in a well known manner by helically arranged grooves. In one embodiment of the invention, the flanged centering sleeve is inserted between elastic rings in a spindle bolster upper part to be fitted on the spindle rail.

In the one-piece construction of the spindle bolster, as shown, with the flange to be fitted on the spindle rail, an insert is mounted in the spindle bolster bore and serves as a support for the neck bearing. In this case, the insert is recessed to accommodate the neck bearing, and the end ring flange of the centering sleeve bears against the shoulder of the insert recess.

The centering sleeve fitted in the spindle bolster may at the same time accommodate the neck bearing, and for that purpose it may be widened in diameter above the spindle bolster face.

One construction according to our invention provides for the accommodation of a damping means between the lower part of the centering sleeve and the spindle bolster. As has been shown, our bearing unit can also be designed with the neck bearing mounted directly in the upper part of a two-piece spindle bolster, and with the centering sleeve supported by means of an elastic bushing in the lower part of the bolster, the damping means being accommodated above this bushing in the annular space between the centering sleeve and the upper part of the spindle bolster.

In each case, the most effective way of securing the neck bearing in place is that of flanging the upper edge of its support against a spacing ring covering the end face of the neck bearing.

The damping of vibration on the part of the centering sleeve can be accomplished by introducing metallic and/or non-metallic damping means, known in themselves, between the centering sleeve and the spindle bolster.

The spindle bearing according to the invention warrants permanent and accurate alignment of neck and footstep bearing within normal speed ranges and, in combination with the damping means specially provided, contributes to mitigate the whirring of the spindle in and above the critical speed ranges to a hitherto unattainable degree.

It will be apparent that while we have shown and described our invention in a few forms only, many changes and modifications may be made without departing from the spirit of the invention defined in the following claims.

We claim:

1. Bearing unit for spindles of spinning and doubling frames, comprising a spindle bolster provided with a flange to be secured in a bolster rail, a neck bearing for the spindle in the form of a roller bearing, the bolster extending upwardly at least indirectly to the neck bearing to rigidly support the latter, a footstep bearing for the foot end of the spindle, a centering sleeve arranged within the bolster for resiliency but not for longitudinal movements, said sleeve extending from below the rigid neck bearing downwardly and being rigidly held at its upper end and below the neck bearing at least indirectly by the bolster, a portion of the sleeve below the rigidly held upper end of the sleeve being provided with incisions to ensure said resiliency, the sleeve supporting at its lower or free end the footstep bearing, and mechanical means to damp vibrational energies, said means being accommodated between the spindle bolster and the centering sleeve to surround the entire height of the footstep bearing and to extend upwardly approximately to the lower end of said incised sleeve portion.

2. In the unit according to claim 1, an insert rigidly clamped between the upper ends of the bolster and centering sleeve, the upper end of the sleeve being thus directly supported by the insert, the insert also supporting the neck bearing.

3. In the unit according to claim 1, the spindle bolster being provided with a bore at its upper end, the neck bearing being disposed within said bore, two elastic rings being fitted within the spindle bolster beneath the neck bearing, the centering sleeve being provided with a flange, said flange being supported between said rings.

4. In the unit according to claim 1, the damping means extending downwardly beyond the footstep bearing.

References Cited in the file of this patent

UNITED STATES PATENTS

| | | |
|---|---|---|
| 357,904 | Chapman | Feb. 15, 1887 |
| 875,503 | Chapman | Dec. 31, 1907 |
| 2,283,963 | Winslow | May 26, 1942 |
| 2,486,296 | Laird | Oct. 25, 1949 |
| 2,514,157 | Hilton | July 4, 1950 |
| 2,529,904 | Beerli | Nov. 14, 1950 |
| 2,583,080 | Beerli | Jan. 22, 1952 |
| 2,631,070 | Pitner | Mar. 10, 1953 |

FOREIGN PATENTS

| | | |
|---|---|---|
| 604,869 | France | Feb. 6, 1926 |
| 428,075 | Germany | Apr. 22, 1926 |
| 203,923 | Switzerland | July 1, 1939 |